April 7, 1959     H. A. PANISSIDI     2,880,838
FLUID MOTOR CONTROL

Filed Dec. 31, 1954     3 Sheets-Sheet 1

FIG_1_

INVENTOR.
HUGO A. PANISSIDI

BY J. X. Worser
AGENT

April 7, 1959

H. A. PANISSIDI 2,880,838

FLUID MOTOR CONTROL

Filed Dec. 31, 1954

April 7, 1959   H. A. PANISSIDI   2,880,838
FLUID MOTOR CONTROL
Filed Dec. 31, 1954   3 Sheets-Sheet 3

United States Patent Office 2,880,838
Patented Apr. 7, 1959

2,880,838

FLUID MOTOR CONTROL

Hugo A. Panissidi, Binghamton, N.Y., assignor to International Business Machines Corporation, New York, N.Y., a corporation of New York Application December 31, 1954, Serial No. 479,103

19 Claims. (Cl. 197—133)

The invention relates to control apparatus and more particularly to control apparatus for a fluid motor.

It is one of the objects of the invention to provide a control for a fluid motor which is selectively operated at different speeds.

It is another object of the invention to provide a selective control means for a fluid motor which provides for intermittent and continuous movement.

It is still another object of the invention to provide fluid drive means for a rotatable member which is intermittently advanced at one rate and continuously advanced at another rate.

One application for a fluid motor and the improved control therefor is in a carriage drive for an accounting machine or the like. The carriage in an accounting machine is adapted to selectively advance the paper or forms at line-space speed and at eject speeds. As higher printing speeds are required, the demands on the mechanical clutching devices and the like normally employed for operating the carriage tend to exceed their design limitations; therefore, excessive wear and failures occur at an increasing rate. It is to applications of this general type wherein high speed advancing and stopping of a rotatable member is desired that this invention is particularly directed.

In accordance with the preferred embodiment of the invention, there is provided a pair of constantly driven pumps whose discharges are selectively connected to the input of a fluid motor and to a pair of control valves. These control valves also have one side of each parallel connected to the outlet or exhaust side of the fluid motor, which, in turn, is connected to a rotatable shaft or platen mounted in the carriage. Under normal conditions, the valves are so positioned as to block the flow of fluid from the motor outlet and to bypass the fluid delivered by the pumps. In addition, a line-spacing detent holds the shaft or platen stationary which, with the blocking of the fluid motor by the valves, insures that the entire drive assembly remains stationary. One of the valves is adapted to control line-spacing or intermittent rotation of the platen, while the other valve controls the eject or continuous rotation of the same. Each valve has associated therewith an armature and a pair of associated magnets for each armature adapted to be alternately pulsed to provide start and stop movements to the valves to control the fluid motor at line-space and eject speeds.

During line-spacing operation, the eject valve is held in its fluid by-passing position and the line-space valve is operated by the related start and stop magnets to open and close the outlet passage from the fluid motor. The same pulsing also retracts and then re-engages the shaft detent. Thus, as the line-space valve connects the motor outlet to exhaust, the fluid by-passing is interrupted. This applies full line pressure to the motor to drive the same which in turn rotates the directly connected shaft. Upon a predetermined degree of shaft rotation, the stop magnet is pulsed which shifts the line-space valve to close the motor outlet passage and reopen the by-pass connection. At the same time the detent is lowered into egagement with the ratchet wheel on the shaft to again lock the same in position for the printing operation. This action is repeated for each line-space impulse received.

Upon receiving a paper eject signal, both the line-space and eject start magnets are pulsed. This transfers both valves to cut off by-passing of fluid through both and connects the exhaust ports of both valves to the motor outlet. With the delivery of both pumps directed to the fluid motor, it is advanced at relatively high speed which, of course, continuously rotates the platen shaft. As the paper or form approaches its desired location, an eject stop pulse is applied to the eject stop magnet which responds by returning the eject valve to normal whereat the fluid is by-passed through the exhaust port and the same is closed with respect to the motor outlet connection. This restricts the motor exhaust area and quickly builds up a back pressure at the outlet side of the motor to decelerate the same and thereby reduce the platen shaft speed. Shortly thereafter the line-space stop magnet is pulsed to return the line-space valve to normal. This action closes the motor outlet and completely by-passes the fluid and thus stops the motor and shaft when the reapplied detent comes to rest against the ratchet wheel. Thus, the apparatus is ready to receive its next line-space or eject signal, as the case may be.

Accordingly, it is still another object of the invention to provide a fluid motor with a control therefor which selectively controls the by-passing of fluid.

It is yet another object of the invention to provide a fluid motor with a control which limits the fluid flow from the motor outlet.

It is still another object of the invention to provide a dual discharge pump and a single fluid motor construction with a control means wherein the discharge from the pumps is selectively directed to said motor.

It is another object of the invention to provide a paper carriage with a hydraulic drive means which is selectively operated at line-space and eject speeds.

It is yet another object of the invention to provide a rotatable shaft with a fluid drive motor having a by-pass control valve which is operative to different positions to control the rate of speed of the shaft.

It is another object of the invention to provide a rotatable shaft with a fluid drive motor secured thereto having a control valve and a shaft locking detent which are conjointly effective to lock the shaft against movement.

Other objects of the invention will be pointed out in the following description and claims and illustrated in the accompanying drawings, which disclose, by way of examples, the principle of the invention and the best mode, which has been contemplated, of applying that principle.

Figure 1:
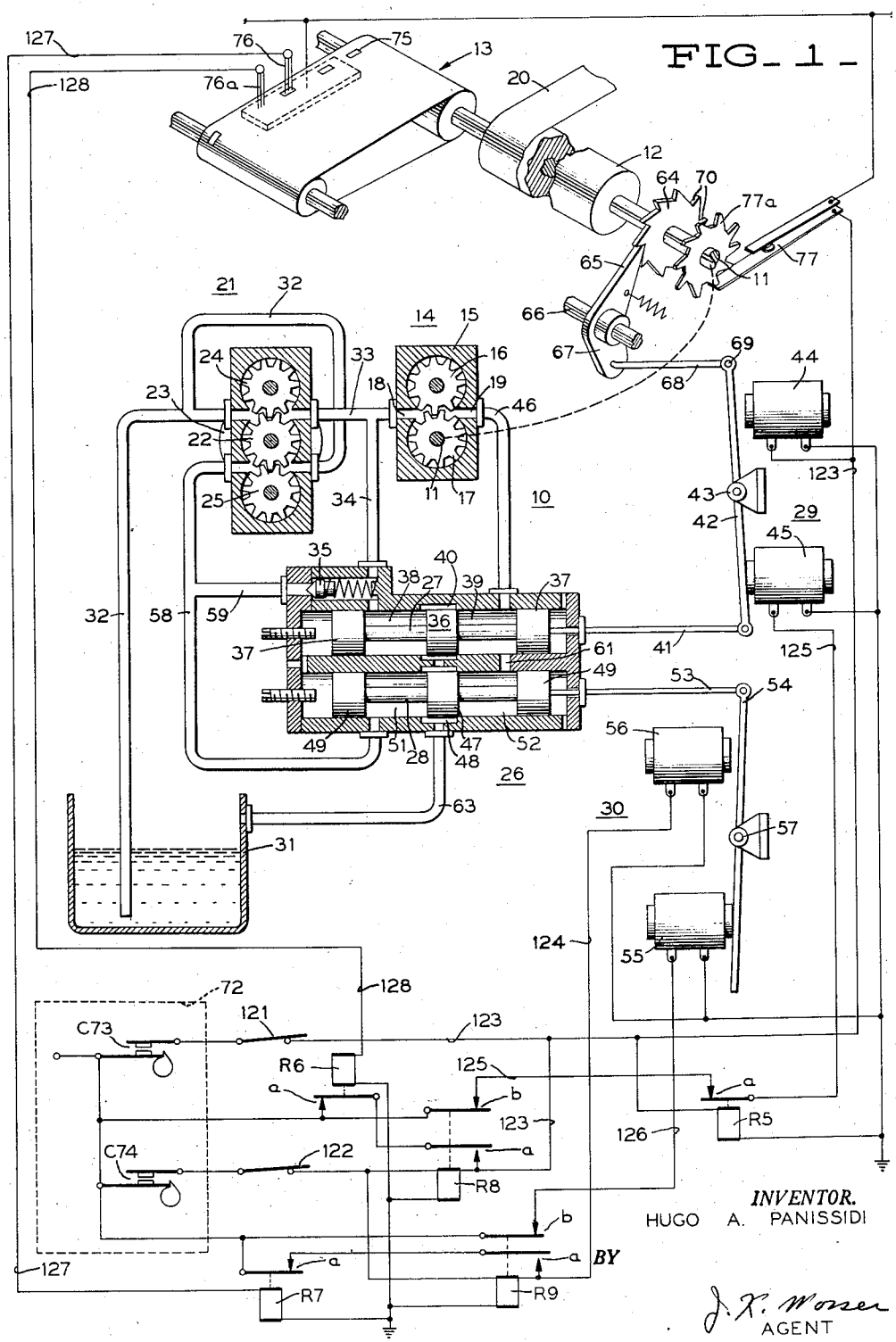
Fig. 1 is a diagrammatic partial isometric and sectional view of the improved control for a fluid motor applied to the carriage of an accounting machine.

Referring now to the drawings for a detail description of the preferred embodiment of the improved hydraulic control mechanism 10 and one application to which it is particularly applicable, there is diagrammatically shown in Fig. 1 a rotatable driving shaft or member 11 having a platen 12 or the like mounted thereon forming a portion of a carriage mechanism (not shown). The platen is adapted to guide paper forms or the like 20, on which the printing takes place. The shaft 11 may also directly drive a tape unit 13 which is adapted to control certain paper feeding functions to be later described.

A fluid or hydraulic motor 14 having a stationary housing 15 enclosing a pair of meshing driven gears or the like 16 and 17, respectively, is provided with a fluid inlet 18 and a fluid outlet or exhaust 19, to and from which fluid is conducted on opposite sides of the meshing gears in the standard manner. In this modification, the gear 17 is directly connected to the platen or drive shaft 11 so that movement of the fluid motor results in corresponding shaft and platen movement.

In order to selectively drive and control the motor 14, there is provided, in this instance, a fluid pressure generating means 21 in the form of a dual discharge positive displacement gear pump or the like, having a central driving gear 22 driven by a constant speed motor 23 and a pair of meshing driven gear pumps 24 and 25, and control valve means 26 in the form of a pair of spool-type valves 27 and 28, respectively, which are under the individual control of magnet means 29 and 30, respectively.

As shown, fluid may be withdrawn from a suitable sump or reservoir 31 by means of a conduit 32 which is divided and leads to the inlet sides of both pumps 24 and 25, respectively. The first pump 24 defines the line-space pump and the second pump 25 defines the eject pump. The output from the first or line-space pump 24 extends over a conductor 33 leading to the inlet 18 of the fluid motor 14 and includes a branch connection or conduit 34, which may include a portion of a check valve structure 35, leading to the first or line-space spool control valve 27. This line-space control valve includes a central land 36 and pressure balancing spaced end lands 37. The usual left and right-hand chambers 38 and 39, respectively, are provided on either side of the central control land 36 which in turn is disposed to control a central exhaust port 40. The valve is normally urged to the right by a connecting rod or shaft 41 whose outer end is secured to one end of a pivotal line-space armature 42.

In this construction the armature 42 has associated therewith on opposite sides of the armature pivot 43 a line-space start magnet 44 and a line-space stop magnet 45. Under normal conditions, the line-space stop magnet 45 holds the armature 42, and thus the first or line-space spool valve 36 is shifted to the right to close off the right-hand chamber 39 from the central exhaust port 40 and at the same time connect the left-hand chamber 38 thereto. Extending from the outlet 19 of the motor 14 is a connection or conductor 46 leading to the right-hand pressure chamber 39 in the first or line-space valve 27.

As shown, the second or eject spool valve 28 is likewise provided with a central control land 47 associated with an exhaust port 48, spaced end lands 49 and left and right-hand chambers 51 and 52, respectively. A connecting rod or shaft 53 extending from the valve is secured at its outer end to a second pivotal armature 54 and is urged to the right to cut off the right-hand chamber 52 by means of an eject stop magnet 55. Included in the eject control is an eject start magnet 56 disposed on the opposite side of the armature pivot 57 which is operative to shift the eject control valve 28 to the left to connect the right-hand chamber 52 to the central exhaust port 48. The output from the second or eject pressure pump 25 includes a conduit 58 connected to the left-hand chamber 51 of the eject control valve and a branch conduit 59 leading to the inlet of the check valve 35, whose outlet is disposed in the discharge side of the first pump 24 by means of the conduit 34. The right-hand chamber 52 of the eject valve 28 is parallel connected to the right-hand chamber 39 of the line-space valve 27 by means of a passage 61.

Under the conditions shown, with both stop magnets 45 and 55 energized, both valves 27 and 28 are shifted to the right to close off the right-hand chambers 39 and 52 from their respective central exhaust ports 40 and 48. Since no liquid can flow through the exhaust ports, the back pressure in the chambers 39 and 52 equals the inlet pressure, consequently the hydraulic motor 14 remains stationary. During this interval, the discharge from both pumps 24 and 25 is directed through their respective left-hand valve chambers 38 and 51 to the related exhaust ports 40 and 48, respectively, and passes through an exhaust conduit 63 leading to the sump 31. Thus, the entire fluid output is by-passed through both valves around the fluid motor 14.

In order to insure that the platen 12 is held stationary at predetermined positions, a line-spacing ratchet wheel 64 is secured to the platen shaft 11 which is engaged by a detent or pawl 65 pivoted on a stub shaft 66, mounted on a stationary portion of the carriage housing. This detent includes a rocker arm 67 and a connecting rod or wire 68 whose outer end is secured to one end 69 of the line-spacing armature 42. Thus, when the line-space stop magnet 45 is energized, the detent 65 is urged into position and when engaged with a facing tooth 70 on the ratchet wheel 64, the platen 12 is held stationary. This action insures proper spacing of the platen 12 and in effect acts as a double lock against motor movement.

The means for selectively energizing the line-spacing and eject magnets may be accomplished in any suitable manner which is under the control of an accounting machine 72 and the carriage tape 13. For the purposes of this description, there is disclosed, by way of example only, a line-space control cam contact C73 and an eject control cam contact C74. These cam contacts are operative to selectively control their respective start and stop magnets 44 and 45, and 55 and 56, respectively, to operate the valves 27 and 28, respectively. Suitable switches 121 and 122 are in series with the cam contacts C73 and C74, respectively, for controlling the control circuits. At predetermined intervals during line-spacing, as dictated by the accounting machine, the line-space cam contact C73 is closed to energize the line-space start magnet 44 through a suitable conductor 123, as will hereinafter be described. Likewise, the eject start magnet 56 is periodically pulsed through suitable conductors 124 upon closure of the cam contact C74 operating relays R8 and R9 in a similar manner at certain other intervals to selectively operate the same. In addition, the tape 13 includes perforations 75 or the like through which brushes 76 and 76a may make electrical contact and energize relays R6 and R7 to respectively open the eject control relays R8 and R9 at certain predetermined intervals, in accordance with the forms being used in the printing operation. With the circuit as shown, both stop magnets 45 and 55 are energized over the conductors 125 and 126, respectively, and the normally closed contacts R8b and R9b, respectively.

Connected in parallel with the line-space magnet conductor 123 is a relay R5, having a normally closed contact R5a in series with the line-space stop magnet conductor 125 and a lobe operated normally open contact 77. This contact is periodically closed and opened by means of a multilobed cam 77a secured to the shaft 11 and preferably provided with a number of lobes equal to the teeth 70 on the ratchet wheel 64. The relationship is such that when the detent is released, the contacts 77 are normally open. After release by the detent 65 and a slight shaft rotation, the contacts 77 close to continue energization of the line-space magnet 44 over the conductor 123. The relay R5 merely opens the conductor 125 at predetermined intervals to maintain proper circuit conditions during other portions of the operating cycle.

The relay R8 is energized upon closure of the eject cam contact C74 and is held by means of the contact R8a. This circuit, including the series contact R6a, completes the energization of the line-space start magnet 44 at eject time. At the time the cam contact C74 closes, the relay R9 is energized and a circuit is completed over the conductor 124 to energize the eject start magnet 56 and this circuit is held by the contact R9a leading to the supply line. At this time the contacts R8b and R9b open the circuits to the line-space and eject stop magnets 45 and 55, respectively.

During eject, as the appropriate perforation 75 in the tape 13 passes beneath the first brush 76, the relay R7 is momentarily pulsed over the conductor 127 to open the contact R7a and thus break the holding circuit of the relay R9. This de-energizes the eject magnet 56 at the contact R9a and energizes the eject stop magnet 55 through the contact R9b and conductor 126. Thus, the eject valve 28 is returned to normal as described above.

Shortly thereafter, at approximately ten line-spaces, the brush 76a momentarily completes a circuit over the conductor 128 to open the contact R6a to open or return the relay R8 to normal. This action de-energizes the line-space magnet 44 at the contact R8a and energizes the line-space stop magnet 45 over the conductor 125 upon closing of the contact R8b. Additional line-spacing and ejecting occurs in the same manner.

Operation

With the control valves and armatures in the positions shown and the detent 65 engaged in the ratchet wheel 64 against one of the teeth 70, this indicates a position whereat the printing operation may take place. As shown, both normally closed contacts R8b and R9b energize their respective stop magnets 45 and 55 to hold the valves 27 and 28, respectively, to the right and the discharge from both pressure pumps 24 and 25 is directly by-passed around the fluid operated motor 14 through the left-hand valve chambers 38 and 51 and their central exhaust ports 40 and 48 to the sump 31. Thus, the platen is locked in position.

During line-space operation, the line-space cam contact C73 is periodically pulsed in timed relation from the normal accounting machine functions to simultaneously de-energize the line-space stop magnet 45 by opening the contact R5a in the conductor 125 and energize the line-space start magnet 44 over the conductor 123. This action results in tilting movement of the line-space armature 42, which in turn withdraws the detent 65 from the ratchet wheel 64 and shifts the line-space control valve 27 to the left. Transfer of this valve connects the outlet side of the fluid operated motor 14 to the exhaust port 40 and closes the left-hand by-pass chamber 38 connected to the output of the first pump 24. Thus, with the full output from the first pump applied to the motor 14, by virtue of the valve movement, a pressure drop occurs across the motor and this pressure drop results in movement of the same in the direction to advance the platen 12.

After the motor 14 advances a slight amount, the lobe contact is closed to continue the line-spacing conditions above described. After this contact is completed, the cam contact C73 opens. Prior to the desired stopping position, the lobe contact 77 opens, the contact R5a returns to normal and the energization of the line-space start and stop magnets 44 and 45 is reversed or returned to normal. Reversal of the magnet energization results in tilting movement of the armature 42 which pulls on the rod 41 to shift the line-space control valve 27 to the right. This action cuts off the outlet 19 of the motor 14 from the exhaust port 40 and in turn opens the chamber 38 to again by-pass the fluid delivered by the first pump 24 over the conduit 34 to the exhaust port 40. This same action, of course, moves the detent 65 into position.

Due to slight leakage and inertia in the system, this movement occurs prior to the position where the face 70 of the next ratchet tooth is in alignment with the face of the detent 65. Thus, the shaft 11 is rapidly decelerated and with the high back pressure developed in the column provided by the fluid in the chamber 39 and connection 46, a shock absorbing or dynamic braking effect is provided. As the appropriate face of the ratchet wheel tooth 70 engages the detent 65, further rotation of the shaft 11 and platen 12 is prevented. At this time the printing operation may occur. Additional line-space impulses supplied from the control source 72 cause identical line-space operation of the platen.

During the above-described line-spacing operation, the second or eject control valve 28 is held retracted to the right and the discharge from the second or eject pump 25 is directly connected to drain through the exhaust port 48. Thus, it can be seen that, under the line-spacing operation, the eject valve 28 has no effect on the operation of the motor 14.

Assuming now an eject signal is delivered from the control source 72 because it is desired to rapidly advance the platen 12, carrying the paper form 20 to the next printing position, cam contact C74 is closed. Closure of this along with closure of the switch 122 by a card or the like, energizes both relays R8 and R9 which are held by their respective contacts R8a and R9a. This action opens the contacts R8b and R9b to de-energize both stop magnets 45 and 55 and energizes both the start magnets 44 and 56 through the contacts R8a and R9a to rock their related armatures 42 and 54. At this time, the cam contact C73 and lobe contact 77 are shunted. Movement of the armature 42 releases the detent 65 and shifts the related line-space control valve 27, and movement of the armature 54 shifts the associated eject control valve 28 to the left. Thus, with both valves 27 and 28 shifted, the outlet 19 from the motor 14 is divided in parallel to the exhaust ports 40 and 48 of both valves and at the same time the by-passing of both pumps 24 and 25 around the motor is terminated. As the valves 27 and 28 shift to the left and terminate by-passing, the full output of fluid under pressure delivered by both pumps is directed to the inlet 18 of the motor 14. At this time the second or eject pump 25 is connected to the inlet 18 of the motor by means of the now open check valve 35 and conduits 34 and 33. Thus, the motor 14 will advance at a speed equal to the combined outputs of both pumps and it can be seen this advance will be at a very rapid rate.

After a predetermined movement of the platen 12, as determined by control openings 75 in the tape unit 13, which may be approximately 10 line-spaces ahead of the next desired printing position, electrical contact is completed at the brush 76 to momentarily energize the relay R7 over the conductor 127 and open the contact R7a in the holding circuit for the relay R9. This opens contact R9a and closes R9b and thus transfers energization from the eject start magnet 56 to the eject stop magnet 55 and rocks the armature 54 to its normal position. In so rocking, the armature shifts the eject control valve 27 to the right which immediately by-passes the full discharge of the second pump 25 to drain at the exhaust port 48 and closes the right-hand chamber 52 leading to the outlet 19 of the motor. At the time this transfer occurs, the motor 14 is operating at high speed and with the reduction in the fluid supply, the motor, in effect, becomes a pump. This is due to the inertia forces in the system. Due to the fact the total exhaust valve area or port opening has been reduced, the pressure in the chambers 39 and 52 increases rapidly to a relatively high value. This high pressure drop occurs at the restricted area provided by the exhaust port 40. Thus, the net result is that a high back pressure is developed to dynamically brake the motor, which quickly decelerates the same to its line-space speed. Since at this time the motor demands may exceed the output of the first or line-space pump 24, a temporary region of low pressure may exist at the motor inlet 18. Under these conditions, the check valve 35 will momentarily open to supply the fluid deficiency to the system over the conduit 34 to thus prevent cavitation at the pump inlet 18.

Shortly after the energization of the eject stop magnet 55, the tape 13, driven by the shaft 11, advances the perforation to the brush 76a. This completes a circuit over the conductor 128 and momentarily pulses the relay R6 to open the contact R6a. Opening of this latter contact de-energizes the relay R8 to thereby transfer the contacts R8a and R8b. Transfer of these contacts acts to de-energize the line-space start magnet 44 and to re-energize the line-space stop magnet 45. Thus, the line-space valve 27 is returned to its normal or motor outlet cutoff position, in the manner as previously described for line-space operation.

Any combination of line-space and eject control pulse operates the control valves and thus the motor 14 in the same manner. The particular control for these magnets, other than that required for the sequence of operations forms no part of this invention and the particular relay circuitry shown is given by way of example only.

Figure 5:
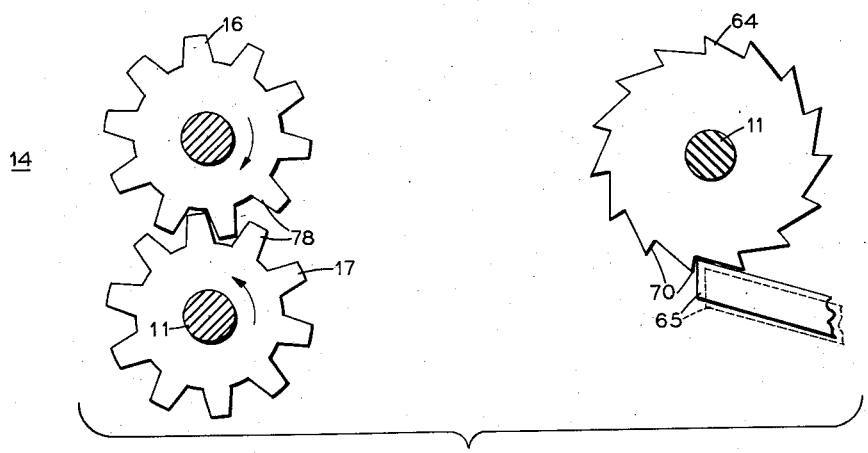
Fig. 5 is a diagrammatic representation of the position of the meshing teeth at the time the detent is lowered into its stop position.
Figure 4:
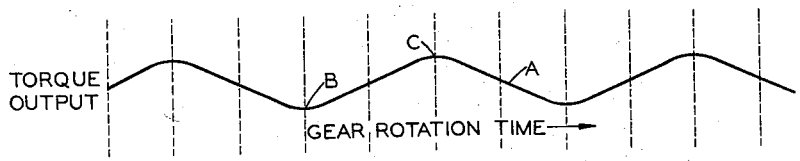
Fig. 4 is a diagram showing the torque output of the fluid motor and the approximate positions at which the locking detent is actuated for stopping shaft rotation.

In Fig. 4, there is diagrammatically shown a curve A indicating an output torque value of the motor 14 during deceleration. From this it can be seen the output torque is not uniform but follows an undulating line. Referring to Fig. 5, this unequal pressure condition is due to the meshing teeth 78 of the rotating gears. In order to transmit minimum shock to the system upon engagement of the detent 65 with one of the teeth 70 on the ratchet wheel 64, it has been found that the initial engagement or release of the detent 65 should take place during the interval when the liquid between the juxtaposed teeth is trapped and is moving in the compression direction. This is shown as between the points B and C on the curve in Fig. 4. Thus, during this portion of operation, the internal torque load on the motor aids in braking the motor along with the developed high back pressure at the motor outlet. By timing the engagement of the detent 65 and one of the tooth faces 70 at substantially the top of this peak, the shock load to the system is reduced to a minimum.

*Modifications*

Figure 2:
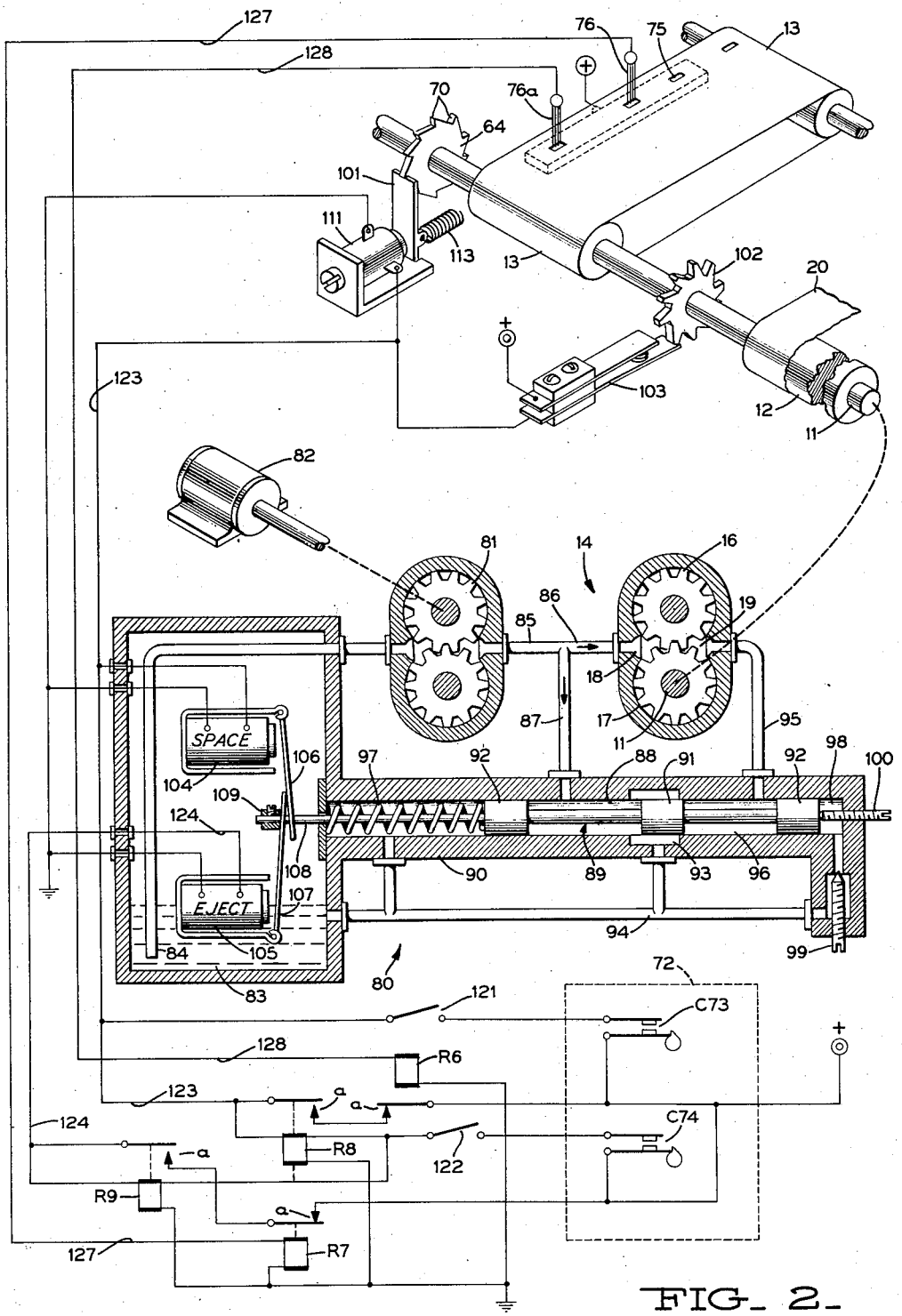
Fig. 2 is a diagrammatic partial isometric and sectional view of a modified fluid motor control applied to similar apparatus.

Referring now to Fig. 2, there is shown a modified fluid drive and control mechanism 80 for the platen 12 of a carriage for an accounting machine or the like. In this construction, the fluid operated motor 14 is directly connected to the platen shaft 11 as in the first modification. However, a single discharge positive displacement gear pump 81 or the like has been substituted for the dual pump in the first modification. The gear pump 81 is constantly rotated in one direction by means of the drive motor 82, which is effective to withdraw liquid or fluid from the reservoir or sump 83 by means of a suction conduit 84 and to deliver the same under pressure to a pressure supply line or connection 85 having branches 86 and 87. The branch 86 of this line leads to the inlet 18 of the motor 14, while the other branch 87 is connected to the left-hand chamber 88 of a spool-type control valve 89 disposed for axial movement in a housing 90. This valve includes the usual central and end lands 91 and 92, respectively, to provide balanced pressure areas and a central exhaust port 93 which connects to a return conduit 94. The exhaust or outlet side 19 of the motor 14 includes a conductor 95 leading to the normally closed right-hand valve chamber 96. As shown, the control valve 89 is normally urged to the right by means of a compression spring 97 to cut off the outlet side of the motor 14 from the exhaust port 91. This thus maintains a closed liquid column in the conduit 95 which is effective to brake the hydraulic motor during the stopping operations due to the back pressure developed thereat.

Also, if desired, the valve means is provided with a dash pot or chamber 98 on the side opposite the spring means 98 which is connected in the usual manner to fluid under normal pressure through an adjustable orifice 99. By adjusting this orifice, the rate of response of the valve may be controlled within close limits. In addition, an adjustable stop means 100 is provided to limit right-hand travel of the control valve beyond the cutoff position of the exhaust port 93. Under the conditions described and as shown, the motor 14 is stationary and the entire output from the pump 81 is by-passed around the motor through the left-hand valve chamber 88 and exhaust port 93.

As in the first modification, the ratchet wheel 64 and a co-operating detent or pawl 101 are provided to lock the platen 12 in position for the printing operation when the control valve 89 is in its motor cutoff or by-passing position. The platen shaft 11 may also include a multi-lobed cam 102 which co-operates with or engages a normally open contact 103 to periodically close and open the same in timed relation with shaft movement in a manner to be hereinafter described.

Associated with the control valve 89 are a pair of magnets, one of which is a line-space control magnet 104 and the other is an eject control magnet 105. Each magnet has a hinged armature 106 and 107, respectively, having outwardly projecting and overlapping bifurcated extensions which embrace an outwardly extending control valve stem 108. The outer end of this valve stem has an adjustable collar 109 secured thereto against which the eject armature 107 rests. The line-space armature 106 may bias against the eject magnet armature in any suitable manner.

Electrically connected in parallel to the line-space magnet 104 is a second or detent magnet 111 disposed in proximity to the line-space detent 101. Both of these magnet coils are connected in parallel through the conductor 123 and to the normally open shaft position switch 103. Since the electrical circuit in this modification is identical with the exception of the stop circuits which have been eliminated, like elements have been given like reference characters and a further detailed description is not deemed necessary. The eject control magnet 105 is electrically connected to the source of control pulses as applied from the cam contact C74 in the accounting machine 72 and, during eject conditions, the relay R8 is energized to shunt the shaft position contacts 103 at the contact R8a to maintain the line-space and detent magnets 104 and 111, respectively, energized during eject operation. It is to be understood, however, that while separate line-space and detent armatures 106 and 101 have been disclosed, a single armature structure may be readily applied without departing from the spirit of the invention. During line-spacing, the cam contact C73 and shaft position switch 103 operate in the previously-described manner.

As shown in the drawings, the platen 12 is stationary, representing its position for normal printing. Under these conditions, the detent 101 engages the appropriate rack tooth 70 and the motor 14 is held stationary due to the cutoff of the right-hand chamber 96 from the exhaust port 93 and the by-passing of the entire output of the pump 81 through the left-hand chamber 88 and exhaust port 93 to drain.

Upon the delivery of a line-spacing pulse from the cam contact C73 in the accounting machine 72 or in any other suitable manner, the parallel connected line-space and detent magnets 104 and 111 are energized over the conductor 123. This action releases the platen shaft 11 for rotation and shifts the control valve 89 to the left a predetermined distance to connect the right-hand chamber 96 to the exhaust port 93. While this valve shifts to the left, under line-spacing conditions, it does not entirely throttle by-passing of the high pressure fluid at the port 93. However, with the outlet of the motor 14 connected to drain, a pressure difference prevails and the same is advanced.

Advancing of the motor rotates the platen 12 and after a predetermined degree of rotation, the normally open contact 103 closes to continue the energization of the above magnets. Upon further rotation, the contact 103 is again opened to de-energize the line-space and detent magnets 106 and 111. De-energization of the detent magnet permits the detent 101 to be urged to its ratchet wheel by means of a return spring 113 and the valve load spring 97 is effective to return the control valve 89 to cut off the motor from the exhaust port 93. Upon cutoff, the pressure at the motor outlet quickly builds up to provide a braking effect and equalizes on both sides of the motor 14 as the next ratchet tooth 70 comes to rest against the detent 101. Thus the paper will have been advanced for the next line of data to be printed. All subsequent line-spacing pulses operate in the same manner to advance the shaft 11 and platen 12 at line-space speed.

Upon the reception of an eject signal from the cam contact C74, the detent, line-space and eject magnets 101, 104 and 105, respectively, are energized and held by the relays R8 and R9 and the combined energization of the latter two magnets shifts the control valve 89 to the left to entirely cut off by-passing of fluid from the pump 81 through the left-hand valve chamber 88. Thus, the entire output of the pump is directed through the motor 14 to provide a high speed advancing motion to the platen 12. During this interval, the contact R8a is closed to shunt the line-space shaft switch 103 to thereby maintain the detent 101 retracted along with the line-space magnet 104.

After a predetermined limit of travel as determined by the tape 13, driven by the shaft 11, and which may be approximately ten line-spaces ahead of the desired position, the appropriate perforation in the tape 13 passes under the brush 76 and momentarily energizes the relay R7. This opens the holding relay circuit and the contacts R9a and de-energizes the eject magnet 105. Such de-energization permits the control valve to shift, under the force of the spring 97, to the right a predetermined amount to throttle the discharge from the hydraulic motor 14 and at the same time initiates by-passing of a portion of the hydraulic liquid under pressure over the branch line 87. The motor output throttling acts in the manner as previously described to provide for rapid motor and platen deceleration. At the appropriate time, the brush 76a completes the circuit over the conductor 128 to energize the relay R6 to open the circuit to the holding relay R8. Opening of the contact R8a simultaneously de-energizes the line-space and detent magnets 104 and 111 and the control valve 89 immediately returns to its normal motor outlet cutoff position. Thereafter, additional line-space or eject pulses may be directed as desired.

Figure 3:
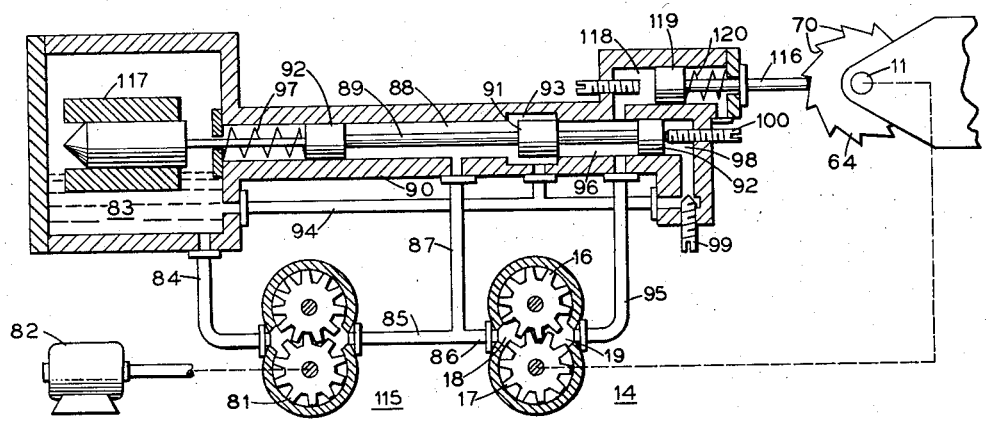
Fig. 3 is a diagrammatic sectional view of still another modification of the improved fluid motor control incorporating a hydraulically operated detent.

Referring now to Fig. 3, there is disclosed still another fluid control means for the fluid operated motor 14 which is substantially identical in construction to the modification shown in Fig. 2. Since like parts are given like reference characters, a further detail description of these common elements is not deemed necessary. This modification involves a fluid operated detent 116 and discloses a single valve actuating magnet 117; however, both a line-space and eject magnet may be substituted, if desired.

As shown, the outlet connection from the motor 14 leads to the right-hand valve chamber 96 in the standard manner. However, a second chamber 118 directly communicates with the chamber 96. In this second chamber 118 is mounted a piston 119 secured to an outwardly projecting stem forming the retractable detent or pawl 116. This detent is adapted to shift axially and engage the appropriate teeth 70 on the rack wheel 64 which in turn is secured to the platen or drive shaft 11 to lock the same in position.

Under the conditions shown, the control valve 89 is urged to the right by means of its spring 97. Thus, the discharge from the pump 81 is by-passed around the motor 14 to drain through the branch line 87 and chamber 88. Since the chamber 96 is cut off from the exhaust port 93, the back pressure at the outlet side of the motor maintains an equally high pressure in the detent piston chamber 118. This pressure acts against the piston 119 and urges the same to the right against the force of the spring means 120 to engage the rack wheel teeth 70 and hold the platen shaft 11 stationary.

During both line-spacing and eject conditions, the control valve 89 is shifted to the left by means of energization of the coil 117 whereby the outlet side 19 of the motor 14 is connected to drain at the chamber 96. In so doing, the pressure drops in the piston chamber 118 and the spring 120 shifts the detent 116 out of engagement with its engaged rack tooth 70. Thus, during all phases of operation, when the motor 14 is being actuated, the low pressure prevailing on the outlet side of the motor maintains the detent 116 retracted and, of course, permits the motor connected to the platen shaft 11 to rotate.

At the end of the line-space or eject pulses, the coil 117 is de-energized and the valve 89 returns to its normal motor outlet cutoff position. This action thereby prevents further discharge through the motor and by-passes the entire output from the pump through the left-hand chamber 88. As cutoff occurs, a slight continued rotation of the motor quickly provides an increasing back pressure which in turn acts on the detent piston to overcome the force of the detent spring 120 and shifts the detent 116 outwardly into engagement with a tooth 70 on ratchet wheel 64. Of course, as the above action occurs, the motor is being decelerated rapidly and at the time of detent and ratchet engagement, rotation of the platen shaft 11 has been reduced to a relatively low safe value.

The above fluid operated detent 116 associated with the fluid operated motor or the like will find many applications wherein relatively slow speed operation is desired. In the first-described modifications, line-spacing speeds in excess of 500 line-spaces per minute may readily be realized with the proper use of electronic control devices.

From the foregoing is can be readily seen that an improved control means has been provided for a fluid operated motor involving a relatively few number of low-cost elements which are reliable in operation and capable of operating under very high line-spacing and eject speeds.

While the above description has been directed to carriage drives for accounting machines and the like, it is to be understood this represents but a single application for the improved fluid operated motor control means and that other applications thereof are possible. Also, the relay circuitry is shown by way of example only. In addition, suitable back pressure regulating and bleed orifices may be utilized in the arrangement to provide for more accurate control.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In fluid control apparatus, the combination of a fluid operated motor driven from a source of fluid under pressure, said motor having an inlet connected to said source and an outlet, valve means, means for connecting said valve means to opposite sides of said motor, means for normally urging said valve means to close said motor outlet and to by-pass the fluid delivered from said source, a shaft driven by said motor, means for normally holding said shaft stationary when said motor outlet is closed, and means for releasing said holding means to release said shaft and for selectively operating said valve means to limit the bypassing of fluid through said valve means and to open the outlet of said motor at intervals to provide an intermittent motor operation and a continuous motor operation.

2. Fluid control apparatus for directing the application of fluid delivered from a source, comprising a fluid operated motor having an inlet connected to said source and an outlet, a shaft driven by said motor, valve means, means for connecting said valve means to opposite sides of said motor, means for normally urging said valve means to close said motor outlet to limit motor movement and to by-pass the fluid delivered from the source therethrough, means for locking said shaft against movement in at least one direction, and means for selectively operating said valve means to limit by-passing of fluid through said valve means and to open the outlet of said motor at intervals to provide motor operation, said means for locking said shaft being released by said valve operating means to permit shaft and motor operation.

3. In a control for a fluid driving means, the combination of fluid pump and motor means, a shaft driven by said motor, means for operating said pump means to provide a substantially constant discharge of fluid under pressure, means for normally by-passing the output from said pump means around said motor, means for selectively applying a portion of the delivered fluid to said motor to intermittently advance the same and for applying the entire output from said pump means to said motor to continuously rotate the same at maximum speed, and shaft locking means for holding said motor against rotation during the fluid by-passing operation.

4. Fluid control apparatus for a fluid driven motor provided with an inlet and an outlet and driven from a source of fluid under pressure, comprising valve means having means therein for directing delivered fluid to exhaust, means for connecting said motor outlet to said valve means, means for connecting said motor inlet to said valve means, means for normally holding said valve means to cut off the flow of fluid from said motor outlet to thereby maintain an equalizing back pressure thereat to hold said motor stationary and to by-pass the delivered fluid under pressure to exhaust, means associated with said valve means for connecting said motor outlet to exhaust and to partially restrict by-passing of fluid to permit motor movement, said last-named means being further operative to completely cut off by-passing of fluid at said valve means to drive said motor at maximum speed, a shaft driven by said motor, and means responsive to the fluid pressure in the system during the by-passing operation for locking said shaft against rotation.

5. In a control for a fluid driven means, the combination of a substantially constant speed pump means for delivering predetermined quantities of fluid, a fluid operated rotary motor having an inlet connected to said pump means and to be operated by the delivered fluid, a shaft to be driven, means for driving said shaft by said motor, means for latching said shaft against rotation in at least one direction, valve means having a double acting fluid control means therein for directing delivered fluid to drain, means for connecting said motor outlet to one side of said control means, means for connecting said motor inlet to the opposite side of said control means, means for normally urging said valve means to cut off said motor outlet from drain to maintain a back pressure thereat to restrain said motor against rotation and to by-pass the fluid delivered by said pump to drain, and magnetically operated means for shifting said valve means to connect said motor outlet to drain to permit motor movement and for disconnecting said latching means from shaft engagement substantially simultaneously with the valve actuation.

6. The combination as claimed in claim 5 wherein said magnetically operated means is selectively operable to effect either partial or complete by-pass restriction of fluid at said valve means to drive said motor and shaft driven thereby at a relatively slow speed or a maximum speed, and means associated with movement of said shaft for returning said valve means to its normal motor outlet blocking and pump output by-passing position.

7. The combination as claimed in claim 5 including a chamber connected to the outlet side of said motor, and a piston disposed in said chamber secured to said latching means, said piston being operative upon a decrease in pressure at said motor outlet caused by valve operation in an opening direction to retract said latch means from said shaft to permit rotation of the same and operative upon cutoff by said valve means and a corresponding increase in the outlet pressure in said chamber to move said latch means into shaft locking position.

8. In control apparatus for a fluid drive, the combination of a shaft to be driven, a latch assembly including a detent associated with said shaft to hold the same stationary, a fluid operated motor including an inlet and outlet and operatively connected to drive said shaft, means for supplying fluid to said motor to operate the same, valve means having fluid receiving sections and an exhaust port therein, a fluid cutoff carried by said valve means for selectively connecting the fluid receiving sections to said exhaust port, a conduit extending from said motor outlet to one of said receiving sections, conduit means between said fluid supply means and said motor inlet and said other of said sections, means for urging said valve means to close said motor outlet at said exhaust port and to by-pass the fluid to said exhaust port to thereby hold said motor against rotation, and valve operating means for releasing said detent in said latch assembly and for selectively operating said valve means to open said motor outlet to exhaust and permit a portion of the delivered fluid to pass therethrough and advance said motor at one rate, or to cut off by-passing of fluid to advance said motor at a faster rate, said valve operating means being effective to return said detent to its latched position and hold said shaft stationary after said valve means moves in a direction to cut off the motor outlet from said exhaust port.

9. The combination as claimed in claim 8 including control means operated in response to shaft movement to effect the exhaust port fluid cutoff and detent returning operation.

10. The combination as claimed in claim 8 wherein said valve operating means includes a pair of magnets, one of said magnets being operative on said valve means to provide the shaft rotation at one rate and both of said magnets being operative on said valve means to provide the shaft rotation at a higher rate.

11. The combination as claimed in claim 10 wherein said valve means includes a pair of independently operable valves parallel connected to said motor and fluid supply means, said valve operating means comprising independent magnets for each of said valves, one of said magnets being operative, when energized, to open said motor outlet to exhaust at one of said valves to advance said shaft at one rate and both magnets, when energized, being operative to actuate both of said valves to terminate by-passing of fluid thereat and thereby advance said motor at a faster rate.

12. In a fluid drive for a paper carriage, the combination of a rotatable platen, a detent associated with said platen to hold the same against rotation, a fluid operated positive displacement motor including an inlet and an outlet and operatively connected to said platen, means for supplying fluid to the inlet of said motor to rotate the same, control valve means for said motor connected to opposite sides of the same, means for urging said valve means to by-pass the fluid delivered to the inlet of said motor, means for operating said detent and said valve means to respectively release said platen and apply high pressure fluid to said motor to operate the same and drive said platen, and means for returning said valve to its fluid by-passing position to stop said motor and for re-engaging said detent to lock said platen against rotation.

13. In a control for a fluid drive for a paper carriage, the combination of a rotatable platen to be selectively advanced at line-space or eject speeds, a detent for limiting movement of said platen during line-space operation, a fluid operated motor connected to rotate said platen, a source of fluid under pressure, valve means, means for connecting said valve means to the source of fluid to by-pass the same about said motor, means for connecting said valve means to maintain an equalizing back pressure on said hydraulic motor and co-operating with said detent to hold said platen stationary, means for momentarily releasing said detent and operating said valve means to direct a portion of the delivered fluid through said motor to permit the same to advance said platen a line-space, said last-named means being effective after operation of said valve means to reapply back pressure on said motor to stop the same and re-engage said detent to lock said platen against rotation, and means for operating said valve means to direct a larger quantity of fluid through said motor to operate the same and said platen at an eject speed.

14. In fluid control apparatus for a fluid operated drive for a paper handling carriage, the combination of a rotatable platen to be advanced at line-space and eject speeds, a detent for limiting movement of said platen during line-space operation, a fluid operated motor provided with an inlet and an outlet and connected to rotate said platen, first and second fluid pumps for delivering fluid under pressure over first and second pressure lines, a check valve between said lines, means for connecting said pressure lines to the inlet of said motor, a line-spacing valve including an exhaust port, means for connecting the high pressure side of said first line to said line-space valve to by-pass the fluid therethrough when said line-space valve is in a first position, means for connecting the outlet of said motor to another portion of said line-space valve to prevent the flow of fluid therethrough when said valve is in its first position and hold said motor against rotation, an eject valve including an exhaust port, means for connecting the outlet of said motor to said eject valve in parallel with said line-space valve, means for connecting said second high pressure line to said eject valve to by-pass the fluid therethrough, means for operating said detent to release said platen and for terminating by-passing of fluid through said line-space valve by opening said motor outlet to said line-space exhaust port, said operating means being effective after valve operation to close said line-space exhaust port and re-engage said detent to stop the platen after a predetermined degree of rotation, means responsive to an eject signal for releasing said detent and operating said line-space and eject valves to direct the entire output of both pumps through said motor to operate the same at high speed, said check valve being operative to conduct the fluid from said second high pressure line to said motor inlet, and control means operative upon platen rotation to return said eject valve to normal fluid by-passing position prior to the return of said line-space valve to its fluid by-passing position to provide for controlled deceleration of said motor.

15. The combination as claimed in claim 14 wherein said last-named means includes start and stop magnets, and a pivotal armature for each start and stop magnet selectively secured to said valves.

16. In fluid control apparatus for a fluid drive for a paper handling carriage, the combination of a rotatable platen to be advanced at line-space and eject speeds, a detent for limiting movement of said platen during line-space operation, a fluid operated motor provided with an inlet and outlet and connected to rotate said platen, a pump for delivering fluid under pressure over a line to the inlet of said motor, a control valve having an exhaust port, means for connecting said high pressure line to said valve and exhaust port for by-passing said motor, means for connecting the outlet of said motor to said valve, said valve being normally held to cut off the outlet of said motor from said exhaust port and shiftable to first and second positions, a line-space magnet having an armature connected to said valve, an eject magnet having an armature connected to said valve, a detent magnet associated with said detent, parallel circuit means for simultaneously operating said line-space and detent magnets, said detent magnet, when energized, being operative to release said platen and said line-space magnet being operative to shift said valve to its first position to connect said motor outlet to exhaust and provide a pressure difference thereover to rotate said motor and platen, means for interrupting said parallel circuit means to return said valve and detent to lock said platen against rotation, and means for simultaneously operating said detent, line-space and eject magnets to shift said valve to its second position and direct the output of said pump through said motor to drive said platen at eject speeds.

17. In fluid control apparatus for a fluid operated drive for a paper handling carriage, the combination of a rotatable platen to be advanced at line-space and eject speeds, a detent for limiting movement of said platen during line-space operation, a fluid operated motor provided with an inlet and outlet and connected to rotate said platen, a pump for delivering fluid under pressure over a line to the inlet of said motor, a control valve having an exhaust port, means for connecting said high pressure line to said valve and exhaust port for by-passing said motor, means for connecting the outlet of said motor to said valve, said valve being normally held to cut off the outlet of said motor from said exhaust port, electric valve actuating means associated with said control valve, said actuating means being operative to shift said valve to connect the outlet from said motor to exhaust, a detent operating piston mounted in a chamber, and means for connecting said chamber to respond to the pressure at the outlet of said motor, said piston being operative upon cutoff of the motor and an increased back pressure thereat to shift said detent to lock said platen against movement, and responsive upon connecting said outlet to exhaust to retract said detent to permit rotation of said platen.

18. In a control for a fluid driving means, the combination of fluid pump means for delivering a substantially constant discharge of fluid under pressure, fluid motor means driven by said pump, shaft means driven by said motor, means for normally by-passing the output from said pump means around said motor, means for selectively applying a portion of the delivered fluid to said motor to intermittently advance the same, means for selectively directing substantially the entire output of said pump to said motor to continuously rotate the same at maximum speed, and shaft locking means responsive to the fluid pressure in a portion of the system for releasing said shaft means prior to motor movement.

19. The combination as claimed in claim 18, wherein said shaft locking means is responsive to the fluid pressure in said portion of the system to lock said shaft against rotation during the by-passing operation.

References Cited in the file of this patent
UNITED STATES PATENTS

| | | |
|---|---|---|
| 1,101,108 | Vogel | June 23, 1914 |
| 2,107,128 | Reingruber | Feb. 1, 1938 |
| 2,251,147 | Mann | July 29, 1941 |
| 2,275,321 | Scates | Mar. 3, 1942 |
| 2,416,801 | Robinson | Mar. 4, 1947 |
| 2,531,428 | Hautzenroeder | Nov. 28, 1950 |
| 2,635,428 | Marsh et al. | Apr. 21, 1953 |